United States Patent
Chimbe et al.

(10) Patent No.: US 10,274,079 B2
(45) Date of Patent: Apr. 30, 2019

(54) CONTROL DEVICE FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Tomohiro Chimbe, Kariya (JP); Norihiro Tsukamoto, Toyota (JP); Keisuke Ota, Toyota (JP); Tomohiro Asami, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 12 days.

(21) Appl. No.: 15/644,252

(22) Filed: Jul. 7, 2017

(65) Prior Publication Data
US 2018/0023698 A1   Jan. 25, 2018

(30) Foreign Application Priority Data
Jul. 25, 2016   (JP) .................. 2016-145573

(51) Int. Cl.
| *F16H 61/08* | (2006.01) |
| *F16H 61/68* | (2006.01) |
| *F16H 61/686* | (2006.01) |
| *F16H 61/04* | (2006.01) |
| *F16H 59/14* | (2006.01) |

(Continued)

(52) U.S. Cl.
CPC .......... *F16H 61/08* (2013.01); *F16H 61/0437* (2013.01); *F16H 61/68* (2013.01); *F16H 61/686* (2013.01); *F16H 59/141* (2013.01); *F16H 59/46* (2013.01); *F16H 2059/148* (2013.01); *F16H 2059/6815* (2013.01); *F16H 2061/0455* (2013.01); *F16H 2061/0459* (2013.01);

(Continued)

(58) Field of Classification Search
CPC .... F16H 59/14; F16H 59/46; F16H 2059/148; F16H 61/0437; F16H 61/08
See application file for complete search history.

(56) References Cited

U.S. PATENT DOCUMENTS

| 5,505,675 A | 4/1996 | Kuriyama et al. |
| 6,547,697 B1 | 4/2003 | Taffin et al. |

(Continued)

FOREIGN PATENT DOCUMENTS

| EP | 1174303 A2 | 1/2002 |
| JP | 2007-187227 A | 7/2007 |

(Continued)

*Primary Examiner* — Edwin A Young
(74) *Attorney, Agent, or Firm* — Oliff PLC

(57) ABSTRACT

An electronic control unit is configured to set a target torque phase time which is used in torque phase control based on an output shaft torque difference. The electronic control unit sets the target torque phase time to be longer when the output shaft torque difference is large than when the output shaft torque difference is small. Accordingly, since the target torque phase time can be appropriately set, it is possible to achieve both of preventing a sudden change in driving force and torsion vibration of an output shaft and preventing a decrease in drivability due to hesitation at the same time. Sudden change in driving force and torsion vibration of the output shaft occur when the difference in driving force between before and after a gear shift is large. Hesitation occurs when the difference in driving force between before and after the gear shift is small.

7 Claims, 8 Drawing Sheets

(51) Int. Cl.
  *F16H 59/46* (2006.01)
  *F16H 59/68* (2006.01)
(52) U.S. Cl.
  CPC .. *F16H 2200/006* (2013.01); *F16H 2200/201* (2013.01); *F16H 2200/2046* (2013.01)

(56) References Cited

U.S. PATENT DOCUMENTS

| | | |
|---|---|---|
| 8,591,378 B2 | 11/2013 | Matsubara et al. |
| 2005/0221956 A1 | 10/2005 | Saitou et al. |
| 2011/0130931 A1* | 6/2011 | Yoshikawa ......... F16H 61/0213 701/55 |
| 2012/0316738 A1* | 12/2012 | Teslak ..................... F16H 59/16 701/53 |
| 2015/0019090 A1* | 1/2015 | Robinette ............. B60W 10/02 701/54 |
| 2015/0353071 A1 | 12/2015 | Tanishima et al. |

FOREIGN PATENT DOCUMENTS

| | | |
|---|---|---|
| JP | 2008051186 A | 3/2008 |
| JP | 2012-251581 A | 12/2012 |
| JP | 2015-140880 A | 8/2015 |

* cited by examiner

FIG. 3

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

CONTROL DEVICE FOR VEHICLE AND CONTROL METHOD FOR VEHICLE

INCORPORATION BY REFERENCE

The disclosure of Japanese Patent Application No. 2016-145573 filed on Jul. 25, 2016 including the specification, drawings and abstract is incorporated herein by reference in its entirety.

BACKGROUND

1. Technical Field

The disclosure relates to a control device for a vehicle including a stepped type automatic transmission and a control method for a vehicle including a stepped type automatic transmission.

2. Description of Related Art

In a stepped type automatic transmission, torque phase control is performed based on a target torque phase time. A technique for performing the torque phase control is described in Japanese Patent Application Publication No. 2012-251581 (JP 2012-251581 A).

In the technique described in JP 2012-251581 A, since it is considered that a driver intends to perform a more rapid gear shift as an accelerator position becomes larger, the target torque phase time is set to become shorter as the accelerator position becomes larger. On the other hand, since it is considered that a driver intends to perform a smoother gear shift as the accelerator position becomes smaller, the target torque phase time is set to become longer as the accelerator position becomes smaller.

SUMMARY

In the torque phase control using the target torque phase time, when the target torque phase time is short and a difference in driving force between before and after a gear shift is large, there is concern that a sudden change in driving force or vibration due to a torsion of an output shaft will occur. On the other hand, when the target torque phase time is long and the difference in driving force between before and after the gear shift is small, there is concern that drivability due to hesitation of the change in driving force will decrease.

The disclosure enables appropriate setting of a target torque phase time in torque phase control of controlling a torque phase based on the target torque phase time.

A first aspect of the disclosure is a control device for a vehicle. The vehicle includes an engine, driving wheels, an automatic transmission, and an electronic control unit. The automatic transmission is connected to the engine via an input shaft and is connected to the driving wheels via an output shaft. The automatic transmission is a stepped type automatic transmission and is configured to establish one shift stage of a plurality of shift stages by selectively engaging a plurality of frictional engagement elements with each other. The electronic control unit is configured to set a target torque phase time during a gear shift of the automatic transmission based on an output shaft torque difference. The output shaft torque difference is a difference between a torque of the output shaft before the gear shift and a torque of the output shaft after the gear shift. The electronic control unit is configured to perform torque phase control based on the set target torque phase time. The torque phase control is control to control torque capacities of a disengagement-side element and an engagement-side element. The plurality of frictional engagement elements include the disengagement-side element and the engagement-side element. The target torque phase time is a time in which the torque phase control is performed.

With the foregoing configuration, the target torque phase time which is used for torque phase control is set based on the output shaft torque difference between before and after the gear shift (which corresponds to a driving force difference between before and after the gear shift). Accordingly, it is possible to achieve both of preventing a sudden change in driving force or torsion vibration of the output shaft due to the driving force difference between before and after the gear shift and preventing a decrease in drivability due to hesitation at the same time.

In the control device for the vehicle, the electronic control unit may be configured to set the target torque phase time to be longer when the output shaft torque difference is large than when the output shaft torque difference is small.

When the gear shift of the automatic transmission is a driving downshift, a thermal load on a friction material of a disengagement-side frictional engagement element (hereinafter also referred to as a disengagement-side element) is likely to increase in the torque phase control. Accordingly, when the target torque phase time is set to be long, there is concern that durability of the friction material of the disengagement-side element will decrease.

Therefore, in the control device for the vehicle, when the electronic control unit determines that the gear shift of the automatic transmission is a driving downshift, the electronic control unit may be configured to set an upper limit of the target torque phase time based on an assigned torque which is taken charge of by the disengagement-side element and an input shaft rotation speed difference in the torque phase control. The input shaft rotation speed difference may be a difference between a rotation speed of the input shaft before the gear shift and a rotation speed of the input shaft after the gear shift.

With the foregoing configuration, by setting the upper limit of the target torque phase time, it is possible to limit the target torque phase time such that the thermal load on the friction material of the disengagement-side element does not increase even when the target torque phase time which is set based on the output shaft torque difference between before and after the gear shift is long. Accordingly, it is possible to prevent a decrease in durability of the friction material of the disengagement-side element.

In the control device for the vehicle, the electronic control unit may be configured to set the upper limit of the target torque phase time to be smaller when a product of a maximum value of the assigned torque and the input shaft rotation speed difference in the torque phase control is large than when the product is small.

In the control device for the vehicle, the electronic control unit may be configured to set the upper limit of the target torque phase time for each disengagement-side element in the torque phase control among the plurality of frictional engagement elements of the automatic transmission.

With the foregoing configuration, the target torque phase time can be appropriately set based on the driving force difference between before and after the gear shift in the torque phase control using the target torque phase time. Accordingly, it is possible to achieve both of preventing a sudden change in driving force or torsion vibration of the output shaft due to the driving force difference between before and after the gear shift and preventing a decrease in drivability due to hesitation at the same time.

In the control device for the vehicle, the electronic control unit may be configured to determine a control operation amount for realizing a gear shift target value using a gear shift model and is configured to control a gear shift.

A second aspect of the disclosure is a control method for a vehicle. The vehicle includes an engine, driving wheels, an automatic transmission, and an electronic control unit. The automatic transmission is connected to the engine via an input shaft and is connected to the driving wheels via an output shaft. The automatic transmission is a stepped type automatic transmission and is configured to establish one shift stage of a plurality of shift stages by selectively engaging a plurality of frictional engagement elements to engage with each other. The control method includes: setting, by the electronic control unit, a target torque phase time during a gear shift of the automatic transmission based on an output shaft torque difference; and performing, by the electronic control unit, torque phase control based on the set target torque phase time. The output shaft torque difference is a difference between a torque of the output shaft before a gear shift and a torque of the output shaft after the gear shift. The torque phase control control to control torque capacities of a disengagement-side element and an engagement-side element. The plurality of frictional engagement elements include the disengagement-side element and the engagement-side element. The target torque phase time being a time in which the torque phase control is performed.

With the foregoing configuration, the target torque phase time which is used for torque phase control is set based on the output shaft torque difference between before and after the gear shift (which corresponds to a driving force difference between before and after the gear shift). Accordingly, it is possible to achieve both of preventing a sudden change in driving force or torsion vibration of the output shaft due to the driving force difference between before and after the gear shift and preventing a decrease in drivability due to hesitation at the same time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an engagement table illustrating engagement states of first to fourth clutches, a first brake, and a second brake for each shift stage in the automatic transmission;

DETAILED DESCRIPTION OF EMBODIMENTS

Hereinafter, embodiments of the disclosure will be described with reference to the accompanying drawings.

First, a vehicle 100 according to this embodiment will be described below with reference to FIGS. 1 to 4.

Figure 1:
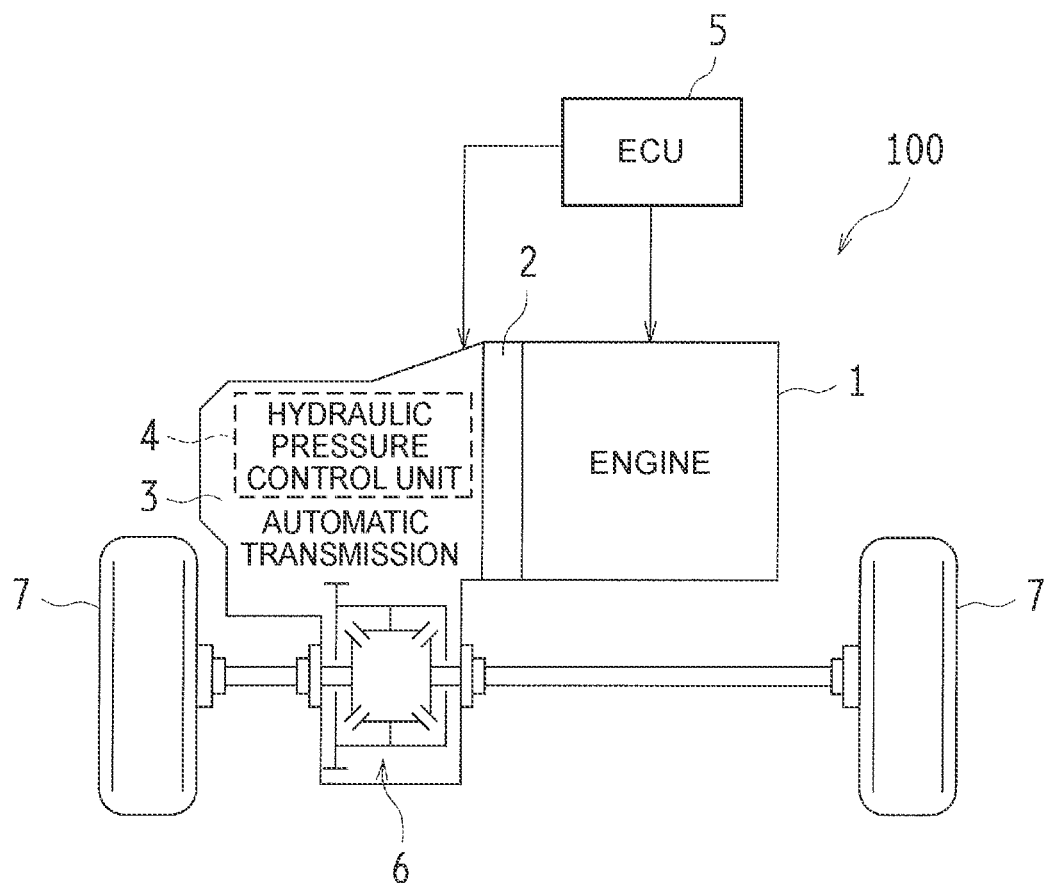
FIG. 1 is a diagram schematically illustrating a configuration of a vehicle equipped with an automatic transmission according to the disclosure.

As illustrated in FIG. 1, the vehicle 100 includes an engine 1, a torque converter 2, an automatic transmission 3, a hydraulic control unit 4, and an electronic control unit (ECU) 5. The vehicle 100 is, for example, of a from engine-front drive (FF) type and is configured such that an output of the engine 1 is transmitted to a differential device 6 via the torque converter 2 and the automatic transmission 3 and is assigned to right and left driving wheels (front wheels) 7.

The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

Figure 2:
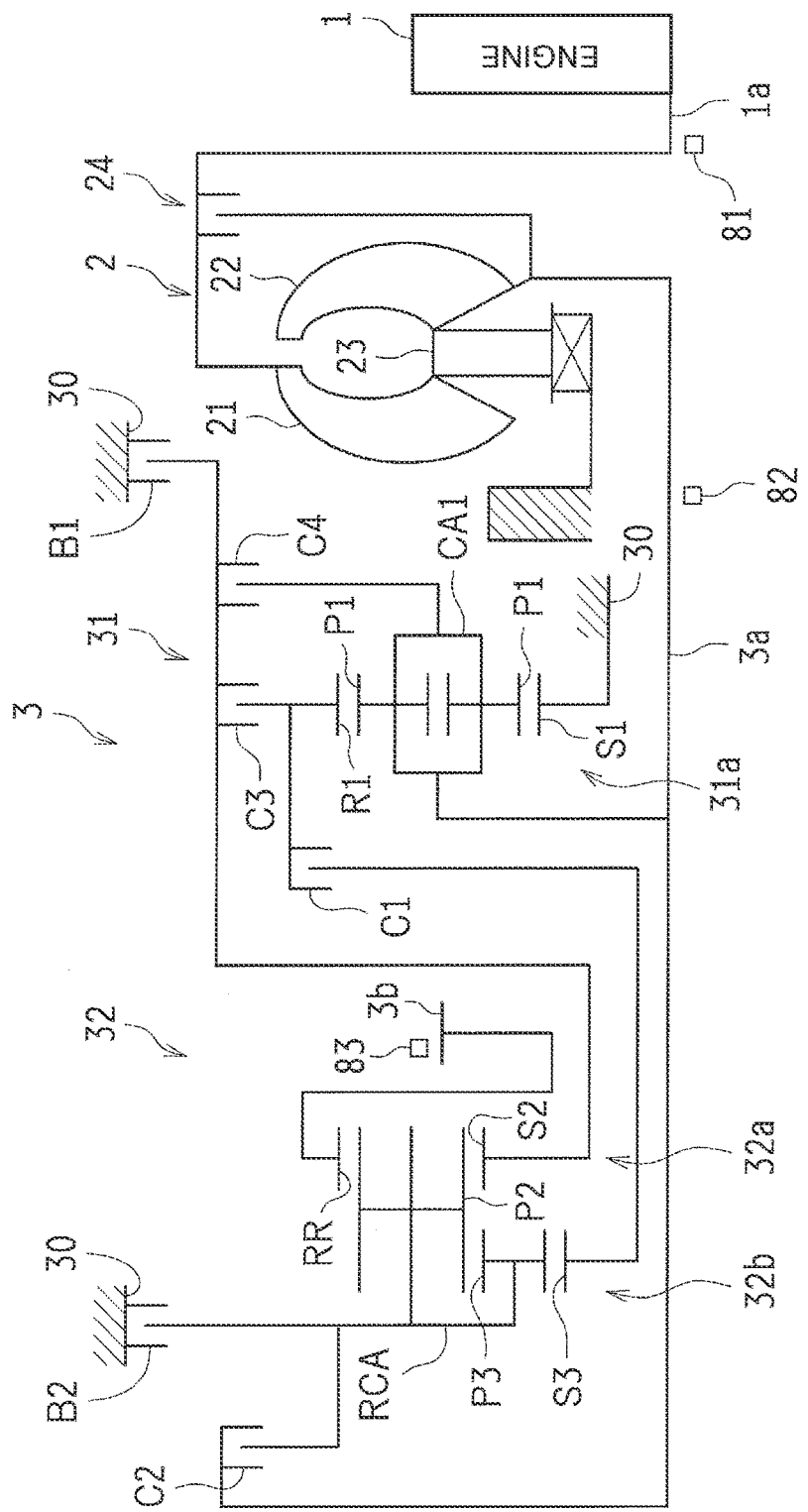
FIG. 2 is a skeleton diagram illustrating a configuration of a torque converter and the automatic transmission.
Figure 4:
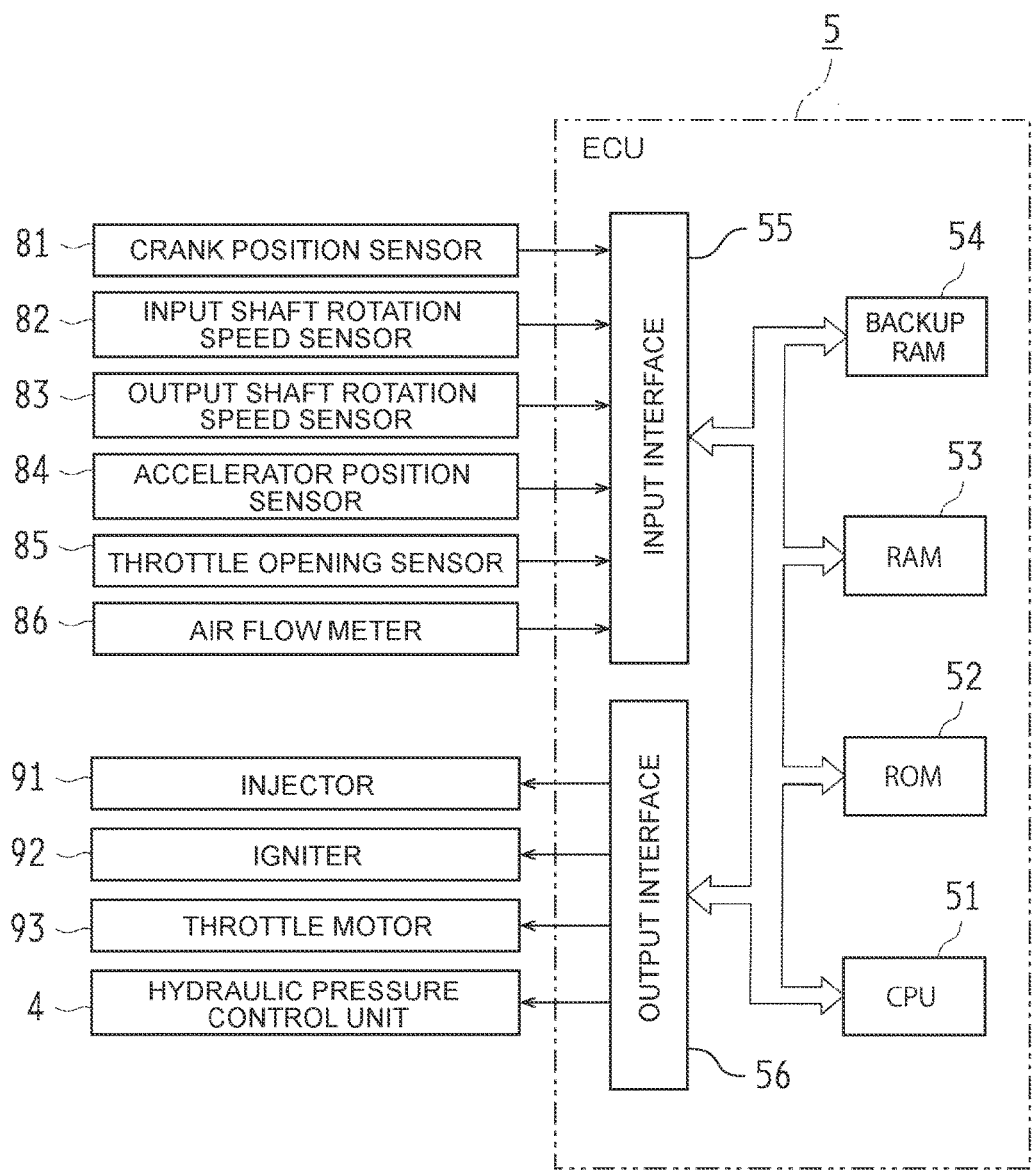
FIG. 4 is a block diagram illustrating a configuration of a control system of the vehicle.

As illustrated in FIG. 2, the torque converter 2 includes a pump impeller 21 that is connected to a crank shaft 1a which is an output shaft of the engine 1, a turbine runner 22 that is connected to the automatic transmission 3, a stator 23 that has a torque amplifying function, and a lock-up clutch 24 that directly connects the engine 1 and the automatic transmission 3 to each other. In FIG. 2, a lower half below a rotation axis of the torque converter 2 and the automatic transmission 3 is omitted and only an upper half is schematically illustrated.

The automatic transmission 3 is disposed in a power transmission path between the engine 1 and the driving wheels 7 and is configured to change a rotation speed of an input shaft 3a and to output the changed rotation speed to an output shaft 3b. In the automatic transmission 3, the input shaft 3a is connected to the turbine runner 22 of the torque converter 2, and the output shaft 3b is connected to the driving wheels 7 via the differential device 6 or the like.

The automatic transmission 3 includes a first gear shift unit (a front planetary) 31 that includes a first planetary gear mechanism 31a as a main element, a second gear shift unit (a rear planetary) 32 that includes a second planetary gear mechanism 32a and a third planetary gear mechanism 32b as main elements, first to fourth clutches C1 to C4, a first brake B1, and a second brake B2.

The first planetary gear mechanism 31a constituting the first gear shift unit 31 is a double pinion type planetary gear mechanism and includes a sun gear S1, a plurality of pairs of pinion gears P1 that engage with each other, a planetary carrier CA1 that supports the pinion gears P1 such that they can rotate and revolve, and a ring gear R1 that engages with the sun gear S1 via the pinion gears P1.

The planetary carrier CA1 is connected to the input shaft 3a and integrally rotates along with the input shaft 3a. The sun gear S1 is fixed to a transmission case 30 and is not rotatable. The ring gear R1 serves as an intermediate output member and is configured to reduce the rotation speed of the input shaft 3a and to transmit the reduced rotation speed to the second gear shift unit 32.

The second planetary gear mechanism 32a constituting the second gear shift unit 32 is a single pinion type planetary gear mechanism and includes a sun gear S2, a pinion gear P2, a planetary carrier RCA that supports the pinion gear P2 such that it can rotate and revolve, and a ring gear RR that engages with the sun gear S2 via the pinion gear P2.

The third planetary gear mechanism 32b constituting the second gear shift unit 32 is a double pinion type planetary gear mechanism and includes a sun gear S3, a plurality of pairs of pinion gears P2 and P3 that engage with each other, a planetary carrier RCA that supports the pinion gears P2 and P3 such that they can rotate and revolve, and a ring gear RR that engages with the sun gear 53 via the pinion gears P2 and P3. The planetary carrier RCA and the ring gear RR are shared by the second planetary gear mechanism. 32a and the third planetary gear mechanism 32b.

The sun gear S2 is selectively connected to the transmission case 30 by the first brake B1. The sun gear S2 is selectively connected to the ring gear R1 via the third clutch C3. The sun gear S2 is further selectively connected to the planetary carrier CA1 via the fourth clutch C4. The sun gear S3 is selectively connected to the ring gear R1 via the first clutch C1. The planetary carrier RCA is selectively connected to the transmission case 30 by the second brake B2. The planetary carrier RCA is selectively connected to the input shaft 3a is the second clutch C2. The ring gear RR is connected to the output shaft 3b and integrally rotates along with the output shaft 3b.

The first to fourth clutches C1 to C4, the first brake B1, and the second brake B2 are frictional engagement elements that are frictionally engaged by hydraulic actuators and are controlled by the hydraulic control unit 4 and the ECU 5.

FIG. 3 is an engagement table illustrating engaged states or disengaged states of the first to fourth clutches C1 to C4, the first brake B1, and the second brake B2 for each shift stage (also referred to as a gear stage), in the engagement table illustrated in FIG. 3, mark O denotes an "engaged state" and a blank denotes a "disengaged state,"

As illustrated in FIG. 3, in the automatic transmission 3 according to this embodiment, the first clutch C1 and the second brake B2 each engage to set a first shift stage (1st) having a largest gear ratio (the rotation speed of the input shaft 3a/the rotation speed of the output shaft 3b). The first clutch C1 and the first brake B1 each engage to set a second shift stage (2nd).

The first clutch C1 and the third clutch C3 each engage to set a third shift stage (3rd). The first clutch C1 and the fourth clutch C4 each engage to set a fourth shift stage (4th).

The first clutch C1 and the second clutch C2 each engage to set a fifth shift stage (5th). The second clutch C2 and the fourth clutch C4 each engage to set a sixth shift stage (6th).

The second clutch C2 and the third clutch C3 each engage to set a seventh shift stage (7th). The second clutch C2 and the first brake B1 each engage to set an eighth shift stage (8th). The third clutch C3 and the second brake B2 each engage to set a reverse shift stage (Rev).

In this embodiment, the forward shift stages (1st to 8th) are set in a clutch-to-clutch gear shift manner.

The hydraulic control unit 4 controls engagement and disengagement of a plurality of frictional engagement elements (the clutches C1 to C4 and the brakes B1 and B2) of the automatic transmission 3. The hydraulic control unit 4 also has a function of controlling the lock-up clutch 24 of the torque converter 2. The hydraulic control unit 4 includes a hydraulic actuator of each frictional engagement element of the automatic transmission 3 and a linear solenoid valve that supplies a controlled hydraulic pressure to the hydraulic actuators.

The ECU 5 is configured to perform operation control of the engine 1, gear shift control of the automatic transmission 3, and the like. Specifically, as illustrated FIG. 4, the ECU 5 includes a CPU 51, a ROM 52, a RAM 53, a backup RAM 54, an input interface 55, and an output interface 56.

The CPU 51 performs an arithmetic process based on various control programs or maps stored in the ROM 52. In the ROM 52, various control programs, maps which are referred to when the control programs are executed, and the like are stored. The RAM 53 is a memory that temporarily stores process results of the CPU 51, detection results of various sensors, and the like. The backup RAM 54 is a nonvolatile memory that stores data to be stored when the ignition is turned off.

The input interface 55 is connected to a crank position sensor 81, an input shaft rotation speed sensor 82, an output shaft rotation speed sensor 83, an accelerator position sensor 84, a throttle opening sensor 85, an air flow meter 86, and the like.

The crank position sensor 81 is provided to calculate a rotation speed of the engine 1. The input shaft rotation speed sensor 82 is provided to calculate a rotation speed of the input shaft 3a (a turbine rotation speed) of the automatic transmission 3. The output shaft rotation speed sensor 83 is provided to calculate a rotation speed of the output shaft 3b of the automatic transmission 3. A vehicle speed can be calculated from the rotation speed of the output shaft 3b. The accelerator position sensor 84 is provided to detect an accelerator position which is a depression amount (an operation amount) of an accelerator pedal. The throttle opening sensor 85 is provided to detect a throttle opening level of a throttle valve. The air flow meter 86 is provided to detect an amount of intake air of the engine 1.

The output interface 56 is connected to an injector 91, an igniter 92, a throttle motor 93, the hydraulic control unit 4, and the like. The injector 91 is a fuel injection valve and an amount of fuel injected therefrom can be adjusted. The igniter 92 is provided to adjust an ignition timing using an ignition plug. The throttle motor 93 is provided to adjust the throttle opening level of the throttle valve.

The ECU 5 is configured to control the operation state of the engine 1 by controlling the throttle opening level, the amount of fuel injected, and the ignition timing, and the like based on the detection results of various sensors. The ECU 5 is configured to perform gear shift control of the automatic transmission 3 and control of the lock-up clutch 24 of the torque converter 2 by controlling the hydraulic control unit 4.

In the gear shift control by the ECU 5, a required shift stage is set, for example, based on a gear shift map with the vehicle speed and the accelerator position as parameters, and the hydraulic control unit 4 is controlled such that an actual shift stage is the required shift stage. The gear shift map is a map in which a plurality of areas for calculating an appropriate shift stage (one of the 1st to 8th shift stages having optimal efficiency) are set depending on the vehicle speed and the accelerator position, and is stored in the ROM 52 of the ECU 5. A plurality of shift lines for defining the areas (upshift lines and downshift lines for defining the shift areas of the 1 t to 8th shift stages) are set in the gear shift map.

The ECU 5 performs torque phase control based on a target torque phase time (a target gear shift time of a torque phase). Details of the torque phase control will be described later.

Before describing control (torque phase control) by which this embodiment is characterized, gear shift control for determining a control operation amount by which a gear shift target value is realized in the automatic transmission 3 will be schematically described below.

First, in this embodiment, a technique of performing a gear shift using a gear shift model for determining a control operation amount by which the gear shift target value is realized is employed as the gear shift control. The gear shift target value is a target value of a factor (such as a shifting time or a driving force) for determining a change mode to be realized at the time of a gear shift. The control operation amount is a value required during operation for a factor (such as an engine torque or a torque capacity of a frictional engagement element) to reach a control target.

Gear shift control using a gear shift model will be described below. Equations of motion during the gear shift are expressed by Equations (1) and (2).

$$d\omega t/dt = a1 \cdot Tt + b1 \cdot Tcapl + c1 \cdot Tcdrn + d1 \cdot d\omega o/dt \quad (1)$$

$$To = a2 \cdot Tt + b2 \cdot Tcapl + c2 \cdot Tcdrn + d2 \cdot d\omega o/dt \quad (2)$$

Equations (1) and (2) are derived from equations of motion of connected rotary elements constituting the automatic transmission 3 and relational expressions of planetary gear mechanisms constituting the automatic transmission 3. The equation of motion of each rotary element is an equation of motion in which a torque which is expressed by a product of a moment of inertia and a change rate of a rotation speed in each rotary element is defined by a torque acting on a member associated with the rotary element among three members of the planetary gear mechanism and both members of each frictional engagement element. The relational expressions in each planetary gear mechanism are relational expressions in which a torque relationship between three members and a relationship in rotation speed change rate in the planetary gear mechanism are defined using a gear ratio of the planetary gear mechanism.

In Equations (1) and (2), $d\omega t/dt$ is a derivative with respect to time, that is, a change rate, of a turbine rotation speed (a rotational angular velocity) $\omega t$ (that is, an input shaft rotation speed $\omega i$ of the automatic transmission 3) and denotes an acceleration of the input shaft 3a (an angular acceleration which is hereinafter referred to as input shaft acceleration) as a change in speed of a rotary member on the input shaft 3a side. $d\omega o/dt$ is a change rate of an output shaft rotation speed $\omega o$ of the automatic transmission 3 and denotes an output shaft acceleration. Tt denotes a turbine torque which is a torque on the input shaft 3a as a torque on a rotary member on the input shaft 3a side, that is, a transmission input shaft torque (hereinafter also referred to as an input shaft torque) Ti. The turbine torque Tt has the same meaning as an engine torque Te (=Tt/t) in consideration of a torque ratio t of the torque converter 2. To denotes a transmission output shaft torque which is a torque on the output shaft 3b as a torque on a rotary member on the output shaft 3b side. Tcapl denotes a torque capacity of a frictional engagement element that performs an engagement operation at the time of a gear shift. Tcdrn denotes a torque capacity of a frictional engagement element that performs a disengagement operation at the time of a gear shift.

Here, a1, a2, b1, b2, c1, c2, d1, and d2 in Equations (1) and (2) are constants when Equations (1) and (2) are derived and are coefficients which are determined in design from the moment of inertia of each rotary element and the gear ratio of the planetary gear mechanism. Specific numerical values of the constants vary, for example, depending on a gear shift type (for example, a gear shift pattern or a combination of shift stages before and after the gear shift). Accordingly, an equation of motion is individual, but equations of motion corresponding to gear shift types in which the constants differ depending on the gear shift type are used for the gear shift of the automatic transmission 3.

Equations (1) and (2) are gear train equations of motion (hereinafter referred to as equations of motion) of the automatic transmission 3 which are obtained by formularizing a relationship between the gear shift target values and the control operation amounts. The gear shift target values can express target values of the shifting time and the driving force and are handled in the equations of motion.

On the other hand, in this embodiment, the control operation amounts of the control for establishing the gear shift target values (feedback control) are set by three values including the turbine torque Tt (which has the same meaning as the engine torque Te), the torque capacity Tcapl of the engagement-side frictional engagement element, and the torque capacity Tcdrn of the disengagement-side frictional engagement element. Then, since the equation of motion includes two equations of Equations (1) and (2) and there are three control operation amounts, the control operation amounts for establishing two gear shift target values do not have unique solutions.

Therefore, in this embodiment, torque assignment ratios of transmission torques assigned to the disengagement-side frictional engagement element (hereinafter also referred to as a disengagement-side element) and the engagement-side frictional engagement element (hereinafter also referred to as an engagement-side element) are used as limiting conditions for acquiring solutions of the equations of motion of Equations (1) and (2). By using the torque assignment ratios as the limiting conditions, delivery of a torque (that is, a degree of progress in gear shift) between the disengagement-side element and the engagement-side element during the gear shift can be incorporated into the equations of motion and the control operation amounts have unique solutions.

The torque assignment ratios are ratios of the transmission torques at which a total transmission torque on the input shaft 3a is assigned to the disengagement-side element and the engagement-side element when the total transmission torque (the total transmission torque) which needs to be assigned to the disengagement-side element and the engagement-side element to be reengaged during the gear shift of the automatic transmission 3 is replaced with, for example, the torque on the input shaft 3a (the total transmission torque on the input shaft). The torque assignment ratios are changed depending on the degree of progress in gear shift (a degree of progress of the gear shift) during the gear shift.

In this embodiment, when the torque assignment ratio of the engagement-side element is defined as "xapl" and the torque assignment ratio of the disengagement-side element is defined as "xdrn," the torque assignment ratios are defined as follows by Equations (3) and (4) using a torque assignment ratio x (for example, 0≤x≤1) varying in a time series to reflect delivery of a torque during the gear shift.

$$xapl = x \quad (3)$$

$$xdrn = 1 - x \quad (4)$$

The relational expression between the torque capacity Tcapl of the engagement-side element and the torque capacity Tcdrn of the disengagement-side element can be defined using "x" (=xapl) and "1−x" (=xdrn) based on "Tcapl" and "Tcdrn" replaced with the torque on the input shaft 3a and Equations (3) and (4). The relational expressions for calculating the turbine torque Tt, the torque capacity Tcapl of the engagement-side element, and the torque capacity Tcdrn of the disengagement-side element which are the control operation amounts are derived from Equations (1) and (2) and the relational expression between "Tcapl" and "Tcdrn," The turbine torque Tt (which has the same meaning as the engine torque Te) is expressed by a relational expression using "x" (=xapl), "1−x." (=xdrn), the input shaft acceleration dωt/dt, the transmission output shaft torque To, and the like. Similarly, the torque capacity Tcapl of the engagement-side element is expressed by a relational expression using "x" (=xapl), the input shaft acceleration dωt/dt, the transmission output shaft torque To, and the like. Similarly, the torque capacity Tcdrn of the disengagement-side element is expressed by a relational expression using "1−x" (=xdrn), the input shaft acceleration dωt/dt, the transmission output shaft torque To, and the like.

That is, a gear shift model in this embodiment is for calculating the control operation amounts based on the gear shift target values using the equations of motion (Equations (1) and (2)) of the automatic transmission 3 including the gear shift target values and the control operation amounts and the relationships (Equations (3) and (4)) indicating the torque assignment ratios. In this way, in this embodiment, the gear shift of the automatic transmission 3 is performed using the gear shift model by adding the limiting conditions set with the torque assignment ratio x to Equations (1) and (2). Accordingly, even when three control operation amounts are present for two target gear shift characteristic values, three control operation amounts can be appropriately determined using the gear shift model.

Since the equations of motion in which the constants differ depending on the gear shift type (for example, the gear shift pattern or the combination of shift stages before and after the gear shift) are used as described above as the gear shift models, the gear shift models corresponding to the gear shift types are used for the gear shift of the automatic transmission 3. Examples of the gear shift pattern include a driving upshift, a driving upshift, a driving downshift, and a driving downshift. The driving downshift is a downshift when an accelerator pedal is depressed, and the driving downshift is a downshift when the accelerator pedal is not depressed.

For example, in a case of the driving downshift and the driving downshift, when hydraulic control for the frictional engagement elements corresponding to a target shift stage is started in the gear shift of the automatic transmission 3, the gear shift progresses to a step of torque phase in which assignment of a required torque capacity (a target torque capacity) of each frictional engagement element varies. Thereafter, the gear shift progresses to a step of inertia phase in which the gear ratio of the automatic transmission 3 varies. That is, the gear shift of the automatic transmission 3 progresses through a step before torque phase, the step of torque phase, the step of inertia phase, and the step of gear shift end.

A map in which suitable torque assignment ratios varying with the progress in gear shift are set depending on the degree of progress in gear shift for each gear shift pattern is prepared in advance by experiment, simulation, or the like, and is stored in the ROM 52 of the ECU 5.

The ECU 5 reads the torque assignment ratios corresponding to the degree of progress in gear shift from the map at the time of gear shift control, applies the read torque assignment ratios and the gear shift target values (for example, a target shifting time) to the gear shift model, calculates the control operation amounts (such as a target input shaft torque and target torque capacities of the disengagement-side element and the engagement-side element), and performs control (hydraulic control) of the disengagement-side element and the engagement-side element depending on the degree of progress in gear shift such that the calculated target torque capacities are achieved.

The torque phase control which is performed by the ECU 5 will be described below.

First, before describing the torque phase control, a process of calculating an input shaft torque which is transmitted from the engine 1 to the input shaft 3a of the automatic transmission 3 will be described.

For example, based on the amount of intake air acquired from an output signal of the air flow meter 86 and the ignition timing of the engine 1, the ECU 5 calculates the engine torque Te from a preset map or a preset calculating expression. Then, the ECU 5 calculates the input shaft torque b multiplying the calculated engine torque Te b the torque ratio t of the torque converter 2.

When a vehicle state is in a driven area, an influence of an engine friction or an auxiliary unit load on a torque generated from the engine 1 is large and calculation if accuracy of the input shaft torque based on the amount of intake air is likely to degrade. Therefore, when the vehicle state is in the driven area, the engine torque Te is calculated from a preset map or a preset calculating expression based on the engine rotation speed acquired from the output signal of the crank position sensor 81. Then the input shaft torque is calculated h multiplying the calculated engine torque Te by the torque ratio t the torque converter 2.

Regarding the input shaft torque, a torque sensor may be disposed in the crank shaft 1a of the engine 1 or the input shaft 3a of the automatic transmission 3 and the input shaft torque may be calculated based on an output signal of the torque sensor.

A specific example of the torque phase control in a downshift which is performed by the ECU 5 will be described below.

First, in the torque phase control, when the target torque phase time (the time in which the output shaft torque is changed) is short in a downshift in which the driving force difference between before and after the gear shift is large, there is concern that a sudden change in the driving force or vibration due to a torsion of the output shaft will occur. On the other hand, when the target torque phase time is long in a downshift, in which the driving force difference between before and after the gear shift is small, an increase of the driving force is delayed and there is concern that a driver will feel hesitation of all acceleration.

This embodiment is made in consideration of such a problem and realizes control capable of appropriately setting the target torque phase time depending on the driving force difference between before and after the gear shift in the torque phase control using the target torque phase time.

An example of the torque phase control will be described below with reference to the flowchart illustrated in FIG. 5. The control routine illustrated in FIG. 5 is repeatedly performed at predetermined intervals by the ECU 5.

Figure 5:
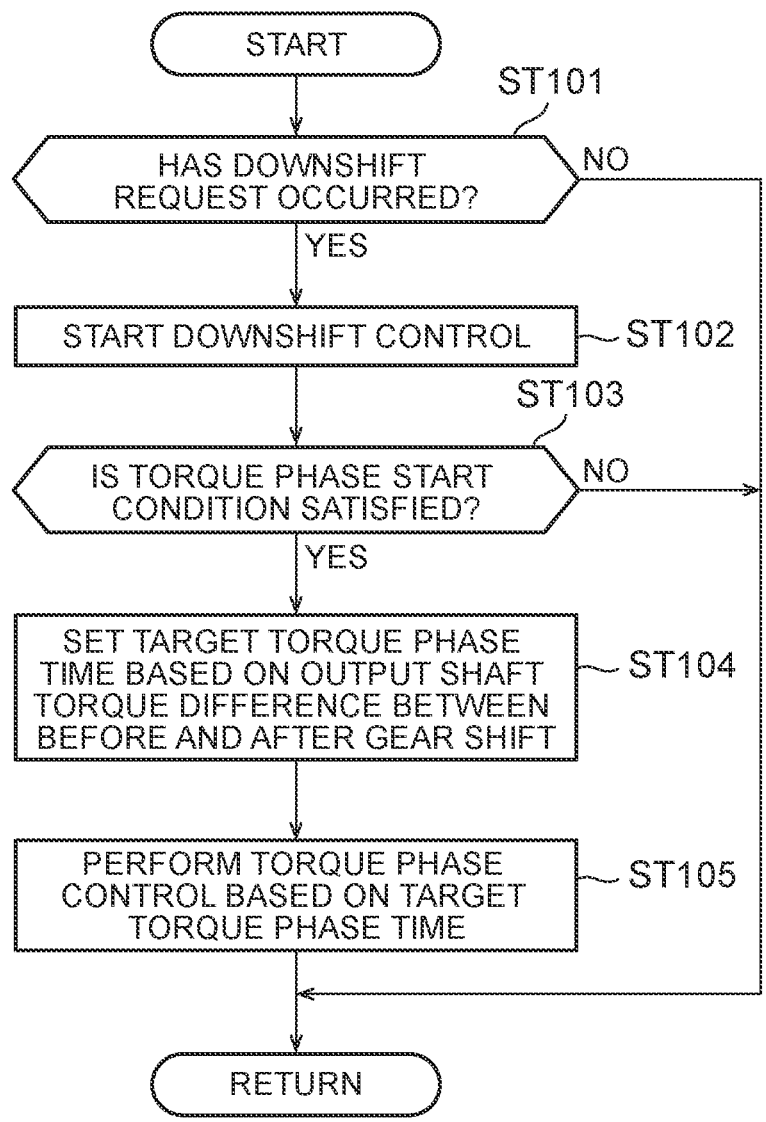
FIG. 5 is a flowchart illustrating an example of torque phase control in a downshift which is performed by an ECU.

When the control routine illustrated in FIG. 5 starts, it is determined in Step ST101 whether a gear shift request of the automatic transmission 3 has occurred based on the vehicle speed acquired from the output signal of the output shaft rotation speed sensor 83, the accelerator position acquired from the output signal of the accelerator position sensor 84, and the gear shift map and the gear shift request is a downshift request.

When the determination result of Step ST101 is negative (NO), the control routine restarts. When the determination result of Step ST101 is positive (YES), the control routine transitions to Step ST102. In Step ST102, downshift control is started.

In Step ST103, it is determined whether a torque phase start condition (for example, a torque assigned to a frictional engagement element starts changing) is satisfied. When the determination result is negative (NO), the control routine restarts. When the determination result of Step ST103 is positive (YES), the control routine transitions to Step ST104.

In Step ST104, the target torque phase time is set based on the output shaft torque difference between before and after the gear shift corresponding to the driving force difference between before and after the gear shift. This setting process will be described later.

In Step ST105, torque phase control of controlling the torque capacities of the disengagement-side element and the engagement-side element which are reengaged (clutch-to-clutch) is performed based on the target torque phase time set in Step ST104.

A process of setting the target torque phase time will be described below.

First, the input shaft torque of the automatic transmission 3 is calculated through the above-mentioned calculating process. Then, the output shaft torque difference between before and after the gear shift [=input shaft torque×gear ratio between before and after the gear shift] is calculated using the input shaft torque and the gear ratios between before and after the gear shift (a ratio of the gear ratio before the gear shift and the gear ratio after the gear shift). The target torque phase time is set with reference to a target torque phase time map illustrated in FIG. 6 using the calculated output shaft torque difference between before and after the gear shift.

Figure 6:
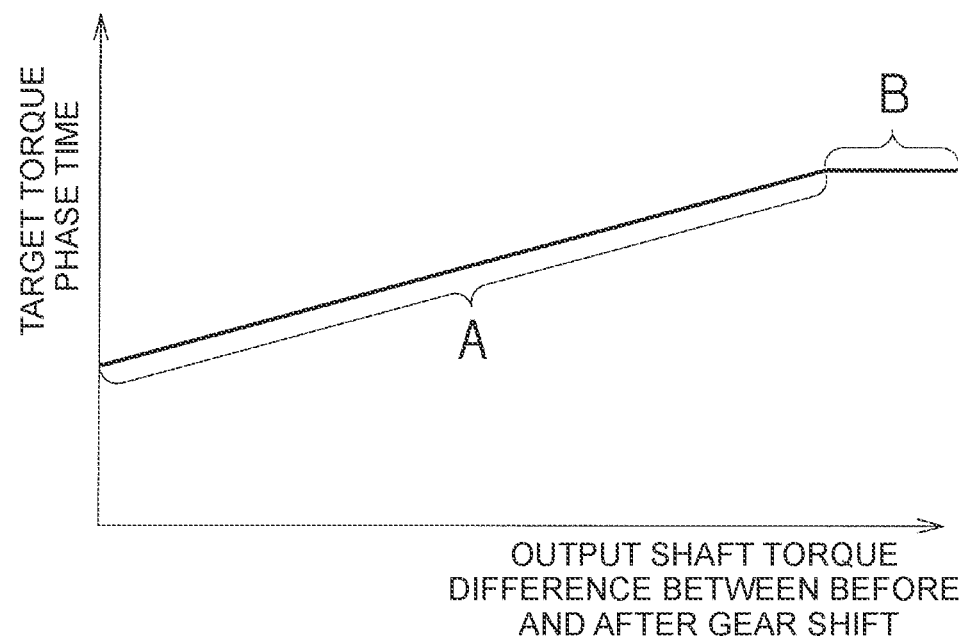
FIG. 6 is a diagram illustrating a target torque phase time map.

The target torque phase time map illustrated in FIG. 6 is a map in which the target torque phase time is set in advance by experiment or simulation using the output shaft torque difference between before and after the gear shift as a parameter and is stored in the ROM 52 of the ECU 5.

In the target torque phase time map illustrate FIG. 6, the target torque phase time is set depending on the output shaft torque difference between before and after the gear shift such that prevention of a sudden change of the driving force or torsion vibration of the output shaft 3b and prevention of a decrease in drivability due to hesitation of the driving force can be achieved at the same time. The sudden change of the driving force and the torsion vibration of the output shaft 3b occur when the output shaft torque difference between before and after the gear shift is large. The hesitation of the driving force occurs when the output shaft torque difference between before and after the gear shift is small.

In the target torque phase time map illustrated in FIG. 6, the target torque phase time is set to be longer when the output shaft torque difference between before and after the gear shift is large than when the output shaft torque difference between before and after the gear shift is small. In the target torque phase time map illustrated in FIG. 6, the gradient of part A is set such that a gradient of the change in driving force in a torque phase is not rapid. Part B is set based on a maximum time for reaching the output shaft torque of the gear stage after the gear shift.

As described above, according to the embodiment, the target torque phase time which is used for the torque phase control is set depending on the output shall torque difference between before and after the gear shift such that the target torque phase time is longer when the output shaft torque difference is large and the target torque phase time is shorter when the output shaft torque difference is small. Accordingly, the sudden change of the driving force or the torsion vibration of the output shaft which occurs when the driving force difference between before and after the gear shift is large can be prevented and the decrease in drivability due to hesitation which occurs when the driving force difference between before and after the gear shift is small can be prevented.

A specific example of the torque phase control in a driving downshift which is performed by the ECU 5 will be described below with reference to the flowchart illustrated in FIG. 7. The control routine illustrated in FIG. 7 is repeatedly performed at predetermined intervals by the ECU 5.

Figure 7:
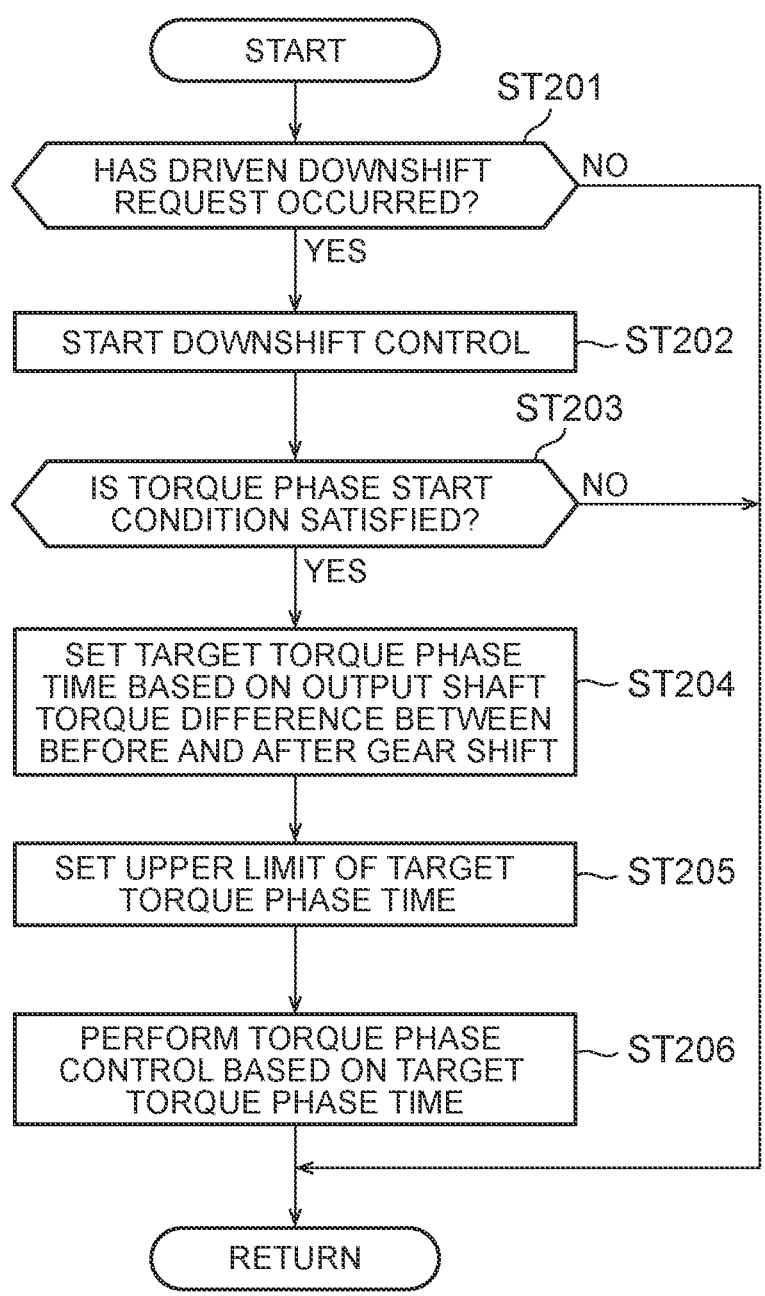
FIG. 7 is a flowchart illustrating an example of torque phase control in a driving downshift which is performed by the ECU.

When the control routine illustrated in FIG. 7 starts, it is determined in Step ST201 whether the gear shift request of the automatic transmission 3 is a driving downshift request. The gear shift request occurs based on the vehicle speed acquired from the output signal of the output shaft rotation speed sensor 83, the accelerator position acquired from the output signal of the accelerator position sensor 84, and the gear shift map.

When the determination result of Step ST201 is negative (NO), the control routine restarts. When the determination result of Step ST201 is positive (YES), the control routine transitions to Step ST202. In Step ST202, downshift control is started.

In Step ST203, it is determined whether a torque phase start condition (for example, a torque assigned to a frictional engagement element starts change) is satisfied. When the determination result is negative (NO), the control routine restarts. When the determination result of Step ST203 is positive (YES), the control routine transitions to Step ST204.

In Step ST204, the target torque phase time is set based on the output shaft torque difference between before and after the gear shift. The setting of the target torque phase time in Step ST204 is performed in the same process as Step ST104 in the control routine illustrated in FIG. 5.

In Step ST205, the upper limit of the target torque phase time is set. A process of setting the upper limit will be described later.

In Step ST206, torque phase control of controlling the torque capacities of the disengagement-side element and the engagement-side element which are reengaged (clutch-to-clutch) is performed based on the target torque phase time set in Step ST204. When the target torque phase time set in Step ST204 is greater than the upper limit of the target torque phase time set in Step ST205, the target torque phase time is limited to the upper limit. The torque phase control is performed based on the limited target torque phase time.

The process of setting the upper limit of the target torque phase time will be described below.

First, when the gear shift of the automatic transmission 3 is a driving downshift, a thermal load on the friction material of the disengagement-side element in the torque phase control is likely to increase. Accordingly, when the target torque phase time is set to be long through the process of Step ST204 in the control routine illustrated in FIG. 7, there is concern that durability will decrease due to the thermal load on the friction material of the disengagement-side element.

Therefore, in this embodiment, the upper limit of the target torque phase time is set in consideration of the thermal load on the friction material of the disengagement-side element. In the method of setting the upper limit, it is noted that the assigned torque taken charge of by the disengagement-side element in the torque phase and the input shaft rotation speed difference between before and after the gear shift are factors which have an influence on an increase in thermal load on the friction material of the disengagement-side element. Specifically, the upper limit of the target torque phase time is set with reference to an upper limit map illustrated in FIG. 8 using a product [assigned torque of disengagement-side element×input shaft rotation speed difference between before and after the gear shift] of a maximum value of the assigned torque taken charge of by the disengagement-side element in the torque phase (hereinafter referred to as an assigned torque of a disengagement-side element) and the input shaft rotation speed difference between before and after the gear shift (which is calculated from the output signal of the input shaft rotation speed sensor 82).

The upper limit map illustrated in FIG. 8 reflects a point that the thermal load on the friction material of the disengagement-side element becomes larger as a product (hereinafter referred to as an upper limit setting product) of the assigned torque of the disengagement-side element and the input shaft rotation speed difference between before and after the gear shift becomes larger. The upper limit of the target torque phase time for limiting the thermal load on the friction material of the disengagement-side element such that the thermal load does not increase is calculated and mapped by experiment or simulation using the upper limit setting product as a parameter. The upper limit map is stored in the ROM 52 of the ECU 5.

Figure 8:
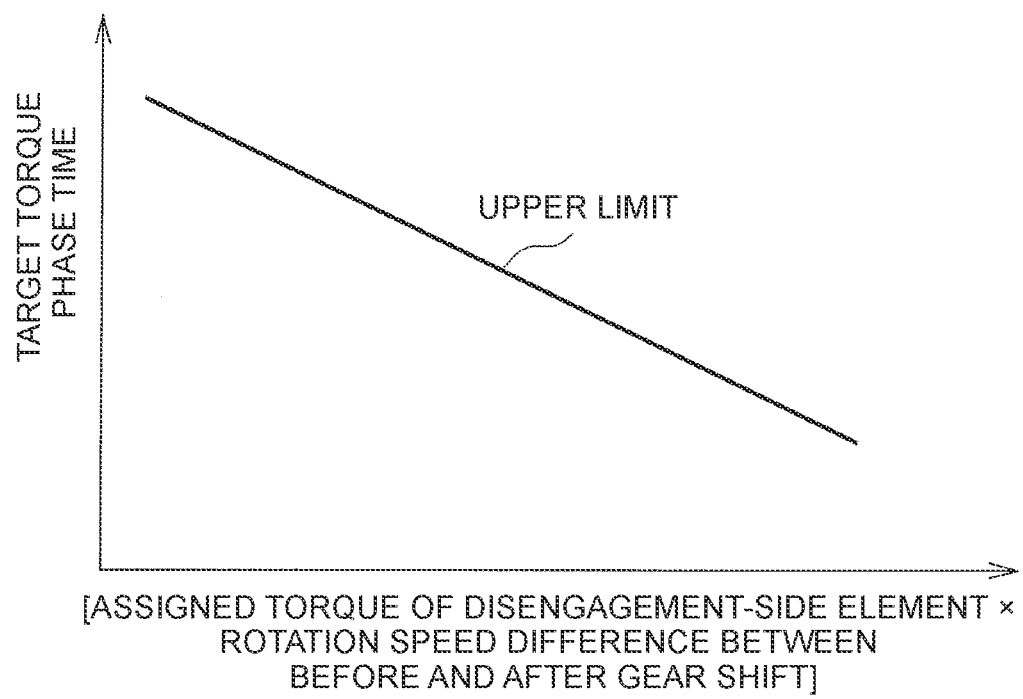
FIG. 8 is a diagram illustrating an upper limit map in which an upper limit of the target torque phase time is set.

In the upper limit map illustrated in FIG. 8, the upper limit of the target torque phase time is set to be lower when the upper limit setting product is large than when the upper limit setting product is small. Such an upper limit map is set depending on durability of each disengagement-side element with respect to the thermal load on the friction material of each disengagement-side element in consideration that the durability of the disengagement-side elements in the automatic transmission 3 including a plurality of frictional engagement elements with respect to the thermal load on the friction material is not fixed.

By setting the upper limit of the target torque phase time as described above, it is possible to limit the target torque phase time such that a thermal load on a friction material of a disengagement-side element does not increase even when the target torque phase time is long. The target torque phase time is a time which is set depending on the output shaft torque difference between before and after the gear shift. Accordingly, it is possible to prevent a decrease in durability of the friction material of the disengagement-side element. In addition, since the upper limit of the target torque phase time is set for each disengagement-side element serving as a disengagement side in the torque phase control, it is possible to more effectively prevent a decrease in durability of the friction material of each disengagement-side element.

The above-disclosed embodiment is exemplary in all respects and does not serve as a basis of restrictive analysis. The technical scope of the disclosure is not construed by only the above-mentioned embodiment, but is defined by the SUMMARY. The technical scope of the disclosure includes all modifications within a meaning and a range equivalent to SUMMARY.

The above-mentioned embodiment scribes an example in which the disclosure is applied to the control of the automatic transmission 3 with eight forward stages. However, the disclosure is not limited thereto and the disclosure can be applied to control of an automatic transmission with seven or less forward stages or nine or more forward stages.

The above-mentioned embodiment describes an example in which the vehicle 100 is of an FF type. However, the disclosure is not limited thereto and the vehicle may be of a front engine-rear drive (FR) type or of a four-wheel driven type.

The above-mentioned embodiment describes an example in which the engine 1 is a multi-cylinder gasoline engine, but the disclosure is not limited thereto. The engine may be a diesel engine or the like.

In the above-mentioned embodiment, the ECU 5 may be constituted by a plurality of ECUs.

The disclosure can be effectively used for a control device fir a stepped type automatic transmission in which a plurality of shift stages are set by selectively causing a plurality of frictional engagement elements to engage with each other.

What is claimed is:

1. A control device for a vehicle having an engine, driving wheels, and a stepped automatic transmission, the automatic transmission being connected to the engine via an input shaft and being connected to the driving wheels via an output shaft, the automatic transmission including a plurality of frictional engagement elements that are each selectively switched between engaged and disengaged states to selectively establish a plurality of shift stages, the control device comprising:

an electronic control unit configured to:

set a target torque phase time during a gear shift of the automatic transmission based on an output shaft torque difference, the output shaft torque difference being a difference between a torque of the output shaft before the gear shift and a torque of the output shaft after the gear shift; and perform torque phase control based on the set target torque phase time, the torque phase control controlling torque capacities of a disengagement-side element and an engagement-side element, the disengagement-side element being one of the plurality of frictional engagement elements that is switched to the disengaged state during the gear shift, the engagement-side element being one of the plurality of frictional engagement elements that is switched to the engaged state during the gear shift, the target torque phase time being a time in which the torque phase control is performed.

2. The control device according to claim 1, wherein the electronic control unit is configured to increase a duration of the target torque phase time as the output shaft torque difference increases.

3. The control device according to claim 1, wherein the electronic control unit is configured so that when the electronic control unit determines that the gear shift of the automatic transmission is a driving downshift, the electronic control unit sets an upper limit of the target torque phase time based on an assigned torque of the disengagement-side element and an input shaft rotation speed difference in the torque phase control, the input shaft rotation speed difference being a difference between a rotation speed of the input shaft before the gear shift and a rotation speed of the input shaft after the gear shift.

4. The control device according to claim 3, wherein the electronic control unit is configured to set the upper limit of the target torque phase time for the disengagement-side element of each of the plurality of frictional engagement elements of the automatic transmission in the torque phase control.

5. The control device according to claim 1, wherein the electronic control unit is configured to set an upper limit of the target torque phase time to decrease as a product of a maximum value of an assigned torque of the disengagement-side element and an input shaft rotation speed difference in the torque phase control increases, the input shaft rotation speed difference being a difference between a rotation speed of the input shaft before the gear shift and a rotation speed of the input shaft after the gear shift.

6. The control device according to claim 1, wherein
the electronic control unit is configured to determine a control operation amount for realizing a gear shift target value using a gear shift model in order to control the gear shift.

7. A control method for a vehicle having an engine, driving wheels, a stepped automatic transmission, and an electronic control unit, the automatic transmission being connected to the engine via an input shaft and being connected to the driving wheels via an output shaft, the automatic transmission including a plurality of frictional engagement elements that are each selectively switched between engaged and disengaged states to selectively establish a plurality of shift stages, the control method comprising:

setting, by the electronic control unit, a target torque phase time during a gear shift of the automatic transmission based on an output shaft torque difference, the output shaft torque difference being a difference between a torque of the output shaft before the gear shift and a torque of the output shaft after the gear shift; and performing, by the electronic control unit, torque phase control based on the set target torque phase time, the torque phase control controlling torque capacities of a disengagement-side element and an engagement-side element, the disengagement-side element being one of the plurality of frictional engagement elements that is switched to the disengaged state during the gear shift, the engagement-side element being one of the plurality of frictional engagement elements that is switched to the engaged state during the gear shift, the target torque phase time being a time in which the torque phase control is performed.

* * * * *